(12) United States Patent
Mould et al.

(10) Patent No.: US 11,878,680 B2
(45) Date of Patent: Jan. 23, 2024

(54) METHOD FOR OPERATING A MOTOR VEHICLE WITH AN ACTIVE PARKING ASSISTANT

(71) Applicant: Ford Global Technologies, LLC, Dearborn, MI (US)

(72) Inventors: Mike John Mould, Leverkusen (DE); Hendrik Jeckel, Overath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 17/513,165

(22) Filed: Oct. 28, 2021

(65) Prior Publication Data

US 2022/0135023 A1 May 5, 2022

(30) Foreign Application Priority Data

Nov. 2, 2020 (DE) .......................... 102020128796.8

(51) Int. Cl.
*B60W 30/06* (2006.01)
*B62D 15/02* (2006.01)
*B60W 60/00* (2020.01)

(52) U.S. Cl.
CPC .......... *B60W 30/06* (2013.01); *B60W 60/001* (2020.02); *B62D 15/021* (2013.01); *B60W 2420/52* (2013.01)

(58) Field of Classification Search
CPC ............... B60W 30/06; B60W 60/001; B60W 2420/52; B60W 10/04; B60W 10/20; B60W 40/02; B62D 15/021; B62D 15/0285
See application file for complete search history.

(56) References Cited

U.S. PATENT DOCUMENTS

2020/0307403 A1* 10/2020 Rastoll .................... H02J 50/10
2021/0081624 A1*  3/2021 Kovarik .................. E01F 9/578

FOREIGN PATENT DOCUMENTS

DE    102013212318 A1   12/2014
DE    102018215525 A1    3/2020

OTHER PUBLICATIONS

Office Action of German Patent Application No. DE 102020128796.8 dated Jun. 7, 2021.

* cited by examiner

*Primary Examiner* — Daryl C Pope
(74) *Attorney, Agent, or Firm* — Frank Lollo; Eversheds Sutherland (US) LLP

(57) ABSTRACT

The invention relates to a method for operating a motor vehicle with an active parking assistant, comprising: determining a parking maneuver data set with at least one parking movement for a parking maneuver for parking in a parking space; determining a quality value representative of the parking situation of the motor vehicle in the parking space after the parking movement; comparing the quality value with a predetermined threshold value; providing the parking maneuver data set if the quality value is less than the threshold value; determining a further parking movement of the parking maneuver data set; determining a further quality value representative of the parking situation of the motor vehicle in the parking space after the further parking movement; and comparing the quality value with a predetermined threshold value if the quality value is greater than the threshold value.

13 Claims, 4 Drawing Sheets

US 11,878,680 B2

METHOD FOR OPERATING A MOTOR VEHICLE WITH AN ACTIVE PARKING ASSISTANT

CROSS-REFERENCE TO RELATED APPLICATIONS

This application claims priority to and the benefit of German Patent Application No. DE 102020128796.8, filed Nov. 2, 2020, which is hereby incorporated by reference herein in its entirety.

FIELD

The invention relates to a method for operating a motor vehicle with an active parking assistant. Furthermore, the invention relates to a computer program product for an active parking assistant, an active parking assistant and a motor vehicle with such an active parking assistant.

BACKGROUND

Such an active parking assistant supports a driver during parking by fully taking over the interventions in the steering and/or drive train necessary for parking. After activating the active parking assistant by pressing a button, a voice command, on a touch screen input or on falling below a certain driving speed, environment sensors of the motor vehicle measure one or more parking spaces while passing, for example transversely to the direction of travel. If a parking space is large enough, this will be indicated to the driver. The active parking assistant then automatically parks in the parking space by intervening in the steering and/or drive train if the active parking assistant is self-driving. In other words, the active parking assistant is self-driving and self-steering. If, on the other hand, the active parking assistant is only self-steering, the driver must set the vehicle in motion by selecting the gear and operating the accelerator pedal, while the active parking assistant steers the vehicle into the parking space.

From JP 2018034540 A and U.S. Pat. No. 9,969,429 B2, such active parking assistants for the operation of a motor vehicle are known.

In order to maneuver the vehicle into the parking space, the parking maneuver is continued until either a predetermined target position is reached within permitted tolerances, or a predetermined, maximum number of parking movements is reached.

Methods for reducing the number of parking movements are known for example from JP 2019014381 A and EP 3608188 A1.

There is a need to identify ways in which further improvements can be achieved here.

SUMMARY

The object of the invention is achieved by a method for operating a motor vehicle with an active parking assistant with the steps:
Determining a parking maneuver data set with at least one parking movement for a parking maneuver for parking in a parking space,
Determining a quality value representative of the parking situation of the motor vehicle in the parking space after the parking movement,
Comparing the quality value with a predetermined threshold value, and
Providing the parking maneuver data set if the quality value is less than the threshold value,
Determining a further parking movement of the parking maneuver data set,
Determining a further quality value representative of the parking situation of the motor vehicle in the parking space after the further parking movement,
Comparing the quality value with a predetermined threshold value if the quality value is greater than the threshold value. Wherein a threshold value assigned to each parking movement is used, wherein at least two threshold values are different.

The quality value can be understood as an actual position at which the motor vehicle would be after executing the current parking maneuver, while the threshold value can be understood as a target value, i.e. how the motor vehicle should ideally be in the parking space.

In other words, the creation of the parking maneuver data set is aborted if the motor vehicle is parked sufficiently well in the parking space. The quality value is a measure of how closely a target position for the vehicle in the parking space would be approached if a parking maneuver were to be carried out according to the parking maneuver data set. The parking maneuver data set will be gradually expanded by parking movement.

Due to the fact that at least two threshold values are different, individual threshold values can be assigned to each parking movement. If, for example, the threshold values become larger with the increasing number of parking movements, the comparison with the threshold value and aborting the creation of the parking maneuver data set if the quality value is less than the threshold value will ensure that only parking maneuver data sets are generated in which each parking movement causes a clear approximation to the target position.

According to one embodiment, the respective threshold values are selected to be at least partially larger with an increasing number of parking movements. In other words, with an increasing number of parking movements, a criterion for aborting becomes more and more soft or easier to achieve, or with an increasing number of parking movements, ever-increasing deviations from a target parking position are tolerated. According to a further embodiment, the quality value is indicative of a difference between a target parking position and an actual parking position of the motor vehicle in the direction of travel. Thus, a target parking position, for example in longitudinal parking, is defined as a target distance from a front and/or rear parked vehicle or a parking space boundary, such as a curb. For example the target parking position can define that the motor vehicle should be parked exactly in the middle between the front and rear parked vehicles, i.e. the distance to the front and/or rear parked vehicle is the same in each case. In this case, the threshold value defines a permissible deviation from the target parking position.

According to a further embodiment, the quality value is indicative of a difference between a target parking position and an actual parking position of the motor vehicle in the direction of the vehicle width. Thus, a target parking position is defined, for example in longitudinal parking, according to which the motor vehicle is aligned in series with a front and/or rear parked vehicle or has the same distance to the side of the road and/or the curb. In this case, too, the threshold value defines a permissible deviation from the target parking position.

According to a further embodiment, the quality value is indicative of a difference between a target parking position and an actual parking position of an orientation of the motor vehicle. The orientation of the motor vehicle is understood to be the angle around the vertical axis of the motor vehicle. Parking in a parking space for transverse parking requires, for example, a 90° rotation of the motor vehicle around its vertical axis in order to achieve a target parking position in such a parking space. Thus, the threshold value defines a permissible deviation from the target parking position in this case too.

The quality value can also be an unweighted or weighted sum of the mentioned quality values, i.e. the quality value is indicative of a difference of a target parking position and of a difference of an actual parking position of the motor vehicle in the direction of travel and/or in the direction of the vehicle width and/or of an orientation of the motor vehicle.

Furthermore, the invention includes a method for operating a motor vehicle with an active parking assistant, with the steps:

Determining a parking maneuver data set with at least one parking movement for a parking maneuver for parking in a parking space, Determining a quality value representative of the parking situation of the motor vehicle in the parking space after the parking movement, Determining a further parking movement of the parking maneuver data set, Determining a further quality value representative of the parking situation of the motor vehicle in the parking space after the further parking movement, Determining a change in the quality value and comparing the change in the quality value with a minimum value and executing the parking maneuver according to the current parking maneuver data set if the change in the quality value is greater than the minimum value.

In other words, for example the difference of two quality values is considered for the change of the quality value before and after a notional or simulated execution of the respective parking movement and the parking movement is only executed if the change in the quality value, i.e. the approach to the threshold value by this parking movement, is above a minimum value. In other words, another parking movement is only carried out if it brings about a significant approximation of the quality value to the threshold value.

Furthermore, the invention includes a computer program product for an active parking assistant, an active parking assistant and a motor vehicle with such an active parking assistant.

BRIEF DESCRIPTION OF THE DRAWINGS

The invention is now explained on the basis of a drawing. In the figures.

DETAILED DESCRIPTION

Figure 1:
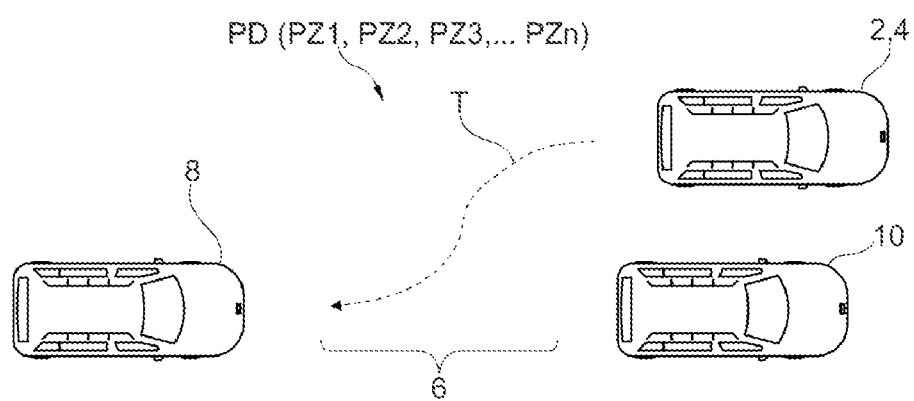
FIG. 1 shows a scenario in which a motor vehicle with an active parking assistant is to be parked in a parking space in a schematic representation.

First of all, reference is made to FIG. 1.

In the scenario shown in FIG. 1, a motor vehicle 2 is to be steered into a parking space 6 by an active parking assistant 4, which may include a controller with a processor and memory. For this purpose and for the tasks and functions described below, the active parking assistant may have 4 hardware (e.g., controller, processor, memory, etc.) and/or software components. That is, the systems and methods described herein may be implemented by a processor.

In the present exemplary embodiment, the parking space 6 is limited by the two parked motor vehicles 8, 10 and is designed for longitudinal parking. In a difference from the present exemplary embodiment, the parking space 6 may also be designed for transverse parking or inclined parking (for example 90° or 45°).

The active parking assistant 4 is designed to detect the parking space 6 by evaluating environmental data provided by environment sensors such as LIDAR, RADAR or ultrasonic sensors or camera systems.

Furthermore, the active parking assistant 4 is designed to determine a parking maneuver data set PD, which defines a sequence of interventions in the steering and/or in a drive train of the motor vehicle 2 in order to cause automatic parking in the parking space 6 according to a trajectory T. In other words, the active parking assistant 4 is self-driving or self-steering.

The parking maneuver data set PD is representative of a parking maneuver according to the trajectory T. A parking maneuver can comprise a plurality of parking movements PZ1, PZ2, PZ2, . . . PZn, wherein a first parking movement PZ1 is separated from a second parking movement PZ2 of the parking maneuver by a change of direction of the motor vehicle 2, etc.

Figure 2:
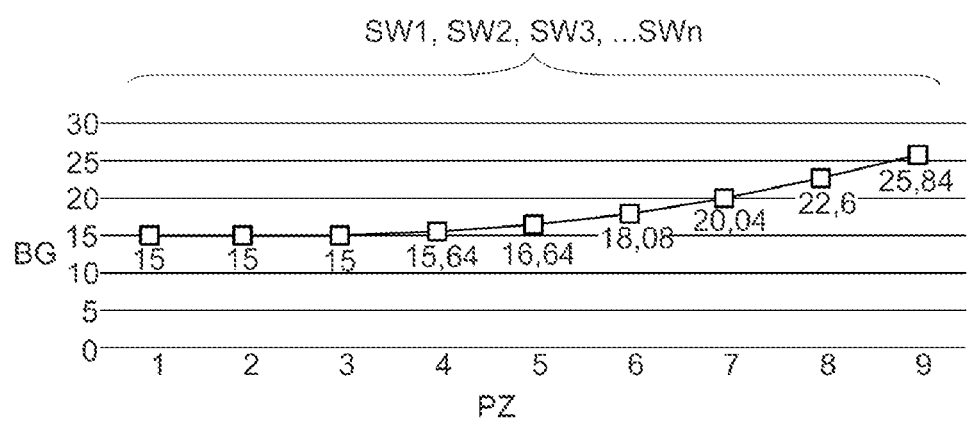
FIG. 2 shows a plurality of threshold values, each of which is assigned to a predetermined number of parking movements in a schematic representation.

Reference is now also made to FIG. 2.

A plurality of threshold values SW1, SW2, SW3, . . . SWn is illustrated, wherein each of the threshold values SW1, SW2, SW3, . . . SWn is assigned to a parking maneuver with a predetermined number of parking movements PZ1, PZ2, PZ3, . . . PZn. In the exemplary embodiment shown in FIG. 2, a first parking maneuver with a parking movement PZ1=1 is assigned a first threshold value SW1=15, a second parking maneuver with two parking movements PZ2=2 is assigned a second threshold value SW2=15, a third parking maneuver with three parking maneuvers PZ3=3 is assigned a third threshold value SW4=15, and a fourth parking maneuver with four parking movements PZ4=4 is assigned a fourth threshold SW4=15.64 etc.

It can be seen that the first three threshold values SW1, SW2, SW3 in the present exemplary embodiment are each assigned the same value 15, while the further threshold values SW4 to SWn are each assigned different values, wherein the respective values increase with an increasing number of parking spaces PZ4 to PZn.

As will be explained in detail later, the threshold values SW1, SW2, SW3, . . . SWn are a kind of criterion for aborting a parking maneuver. In other words, if a reference value BG, which can also be understood as a quality value, for the parking maneuver falls below one of the threshold values SW1, SW2, SW3, . . . SWn the parking maneuvers will be aborted. If, for example, after a parking maneuver with four parking movements, the reference value BG is less than 15.64, the parking maneuver is aborted after four parking movements.

In that in the present exemplary embodiment the threshold values SW3, . . . SWn increase from three parking movements as the number of parking movements increases, the criterion for aborting becomes softer or easier to achieve. In other words, with an increasing number of parking movements, ever-increasing deviations from a target parking position are tolerated.

The reference value BG may be indicative of a difference between a target parking position and an actual parking position of the motor vehicle 2 in the direction of travel and/or in the direction of the vehicle width and/or of an orientation of motor vehicle 2. In other words, the reference value BG can be one-dimensional or multidimensional. If the reference value BG is multidimensional, i.e. it concerns a difference between a target parking position and an actual parking position of the motor vehicle 2 in the direction of travel and a difference in the direction of the vehicle width, a corresponding weighting of the sub-factors, i.e. the respective difference values, may be provided.

Furthermore, the reference value BG may also be indicative of a distance to a limit of the parking space 6, such as the parked motor vehicles 8, 10, or other limits, such as curbs.

To reduce the number of parking movements PZ1, PZ2, PZ3, . . . PZn, the active parking assistant 4 is designed to determine the parking maneuver data set PD with a first parking movement PZ1 for a parking maneuver for parking in the parking space 6.

Furthermore, in the present exemplary embodiment, the active parking assistant 4 is designed to determine a first quality value GW1 representative of the parking situation of the motor vehicle 2 in the parking space 6 after the first parking movement PZ1 in advance in the context of a simulation or preliminary calculation, i.e. before the execution of the parking maneuver according to the parking maneuver data set PD.

The first quality value GW1 may be indicative of a difference between a target parking position and an actual parking position of the motor vehicle 2 in the direction of travel.

However, the first quality value GW1 may also be indicative of a difference between a target parking position and an actual parking position of the motor vehicle 2 in the direction of the vehicle width.

Furthermore, the first quality value GW1 may be indicative of a difference between a target parking position and an actual parking position of an orientation of the motor vehicle 2.

Furthermore, the first quality value GW1 may be indicative of a distance to a limit of the parking space 6, such as the parked motor vehicles 8, 10, or other limits, such as curbs.

The first quality value GW1 may also be an unweighted or weighted sum of the mentioned quality values, i.e. the quality value is indicative of a difference of a target parking position and of a difference of an actual parking position of the motor vehicle 2 in the direction of travel and/or in the direction of the vehicle width and/or of an orientation of the motor vehicle 2.

It should be noted that these statements concerning the first quality value GW1 apply analogously to the further quality values GW2, GW3, . . . GWn.

The active parking assistant 4 compares the first quality value GW1 with the constant threshold value SW.

In the present exemplary embodiment, the first quality value GW1 is greater than the constant threshold value SW. Therefore, the active parking assistant 4 determines another parking movement PZ2 and adds it to the parking maneuver data set PD. Now the active parking assistant 4 determines the further quality value GW2 analogously and again compares this with the constant threshold value SW.

This is repeated by the active parking assistant 4 in the present exemplary embodiment up to the fourth parking movement PZ4, since the fourth quality value GW4 is less than the constant threshold value SW4.

The active parking assistant 4 then provides the parking maneuver data set PD with the parking movements PZ1 to PZ4 for implementation in order to maneuver the motor vehicle 2 into the parking space 6.

In the present exemplary embodiment, the active parking assistant uses 4 threshold values SW1, SW2, SW3, . . . SWn, which as described in FIG. 2 at least partially become larger with an increasing number of parking movements PZ1, PZ2, PZ3, . . . PZn.

In other words, the threshold values SW1, SW2, SW3, . . . SWn form for example a straight line with a positive slope or an increasing exponential function.

Figure 3:
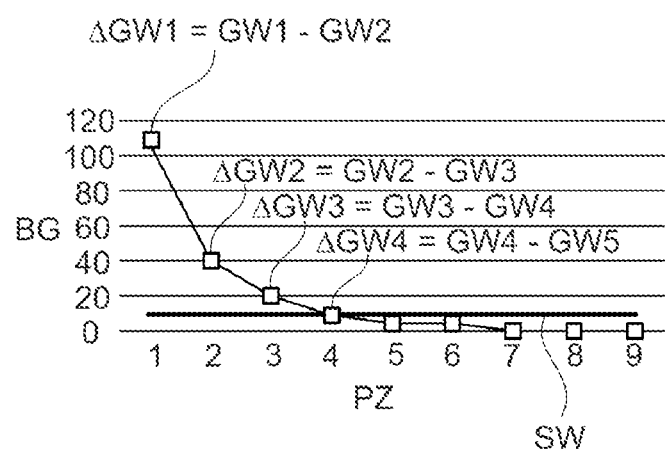
FIG. 3 shows the development of a difference between two immediately adjacent or successive quality values as a function of the respective parking movement compared to a threshold value for a position improvement in a schematic representation.

Reference is now made to FIG. 3.

It shows how a difference between two quality values GW1, GW2, . . . GWn, for example of $\Delta GW1=GW1-GW2$, $\Delta GW2=GW2-GW3$ and $\Delta GW3=GW3-GW4$ as well as $\Delta GW4=GW4-GW5$ develops as a function of the respective parking movement PZ1, PZ2, . . . PZn.

It can be seen that the difference between two quality values GW1, GW2, . . . GWn, for example $\Delta GW1=GW1-GW2$, $\Delta GW2=GW2-GW3$ and $\Delta GW3=GW3-GW4$ and $\Delta GW4=GW4-GW5$ is becoming smaller and smaller. In other words, the benefit of carrying out a parking maneuver with another parking movement PZ1, PZ2, . . . PZn in the sense of improving the achieved parking position decreases.

The respective difference between two quality values, such as $\Delta GW1=GW1-GW2$, $\Delta GW2=GW2-GW3$ and $\Delta GW3=GW3-GW4$ and $\Delta GW4=GW4-GW5$, is compared with a threshold value SW for a position improvement. The threshold value SW can be understood as a minimum benefit that a parking maneuver with another parking movement PZ1, PZ2, . . . PZn has to offer in the sense of a parking position improvement, so that it is executed. In other words, if the difference between two quality values is smaller than the threshold value SW, the parking maneuver will not have another parking movement PZ1, PZ2, . . . PZn added.

Figure 4:
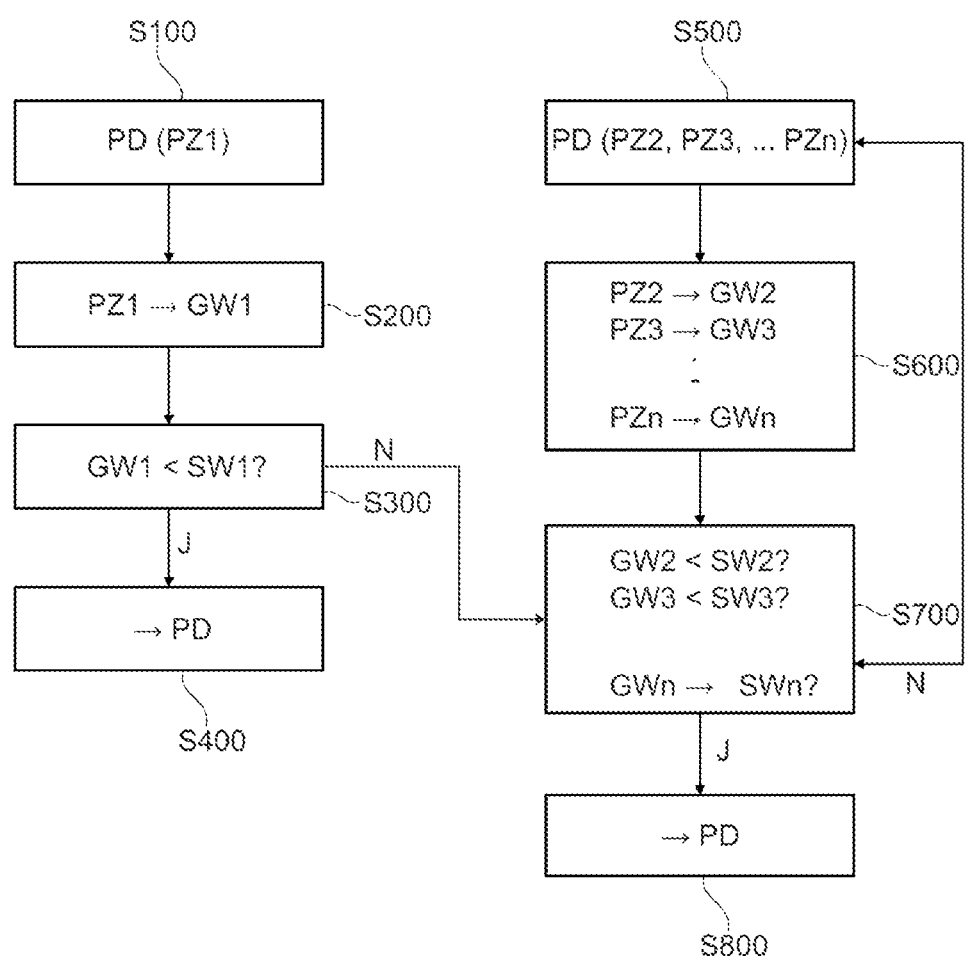
FIG. 4 shows a process sequence in a schematic representation.

Reference is now also made to FIG. 4 to explain a procedure for operating the active parking assistant 4.

After activating the active parking assistant 4 with the press of a button, on a touchscreen input or by falling below a certain driving speed, environment sensors of the motor vehicle 2 measure one or more parking spaces 6, for example transversely to the direction of travel while passing. If the parking space 6 is large enough, this will be indicated to the driver.

Furthermore, in a first step S100, the active parking assistant 4 creates the parking maneuver data set PD with the first parking movement PZ1.

In a further step S200, the active parking assistant 4 determines the first quality value GW1.

In a further step S300, the active parking assistant 4 compares the first quality value GW1 with the first threshold value SW1.

If the first quality value GW1 is less than the first threshold value SW1, the active parking assistant 4 uses the parking maneuver data set PD with the first parking movement PZ1 to automatically steer the motor vehicle 2 into the parking space 6 according to the trajectory T by means of steering interventions and/or interventions in the drive train.

If, on the other hand, the first quality value GW1 is greater than the first threshold value SW1, the method is continued with a further step S500.

In step S500, the active parking assistant 4 determines the further parking movement PZ2 and adds it to the parking maneuver data set PD.

In a further step S600, the active parking assistant 4 compares the further quality value GW2 with the further threshold value SW2 analogously.

Analogous to the first quality value GW1, the further quality values GW2, GW3, . . . GWn may be indicative of a difference between a target parking position and an actual parking position of the motor vehicle 2 in the direction of travel, indicative of a difference between a target parking position and an actual parking position of the motor vehicle 2 in the direction of the vehicle width or indicative of a difference between a target parking position and an actual parking position of an orientation of the motor vehicle 2. Furthermore, analogous to the first quality value GW1, the further quality values GW2, GW3, . . . GWn may be an unweighted or weighted sum of the mentioned quality values, i.e. the quality value is indicative of a difference of a target parking position and of a difference of an actual parking position of the motor vehicle 2 in the direction of travel and/or in the direction of the vehicle width and/or of an orientation of the motor vehicle 2.

If the further quality value GW2 is less than the further threshold value SW2, the active parking assistant 4 uses the parking maneuver data set PD with the first parking movement PZ1 and the second parking movement PZ2 analogously to automatically steer the motor vehicle 2 into the parking space 6 according to the trajectory T by steering interventions and/or interventions in the drive train.

If, on the other hand, the further quality value GW2 is greater than the further threshold value SW2, step S500 of the method is returned to and the active parking assistant 4 determines further parking spaces up to PZn and adds them to the parking maneuver data set PD and compares them with the respective threshold values up to SWn.

The quality value may also be an unweighted or weighted sum of the mentioned quality values, i.e. the quality value is indicative of a difference of a target parking position and of a difference of an actual parking position of the motor vehicle 2 in the direction of travel and/or in the direction of the vehicle width and/or of an orientation of the motor vehicle 2.

In the present exemplary embodiment, the parking maneuver data set PD is provided in the step S400 if the quality value GW1, GW2, GW3, . . . GWn is less than the threshold value SW1, SW2, SW3, . . . SWn, and the steps S500 to S700 are executed if the quality value GW1, GW2, GW3, . . . GWn is greater than the threshold value SW1, SW2, SW3, . . . SWn.

I.e. in the next step S500 a further parking movement PZ1, PZ2, PZ3, . . . PZn of the parking maneuver data set PD is determined and in the further step S600 a further quality value GW1, GW2, GW3, . . . GWn representative of the parking situation of the motor vehicle 2 in the parking space 6 after the further parking movement (PZ1, PZ2, PZ3, . . . PZn is determined and in the further step S700 the quality value GW1, GW2, GW3, . . . GWn is compared with a predetermined threshold value SW1, SW2, SW3, . . . SWn, if the quality value GW1, GW2, GW3, . . . GWn is greater than the threshold value SW1, SW2, SW3, . . . SWn, wherein a threshold value SW1, SW2, SW3, . . . SWn assigned to each parking movement PZ1, PZ2, PZ3, . . . PZn is used, wherein at least two threshold values SW1, SW2, SW3, . . . SWn are different.

In a further step S800, the parking maneuver data set PD with the parking movements PZ1 to PZ4 is then made available for implementation in order to maneuver the motor vehicle 2 into the parking space 6.

In a difference from the present exemplary embodiment, the parking maneuver data set PD can be provided in step S400 if the quality value GW1, GW2, GW3, . . . GWn is less than or equal to the threshold value SW1, SW2, SW3, . . . SWn, and the steps S500 to S700 are executed if the quality value GW1, GW2, GW3, . . . GWn is greater than the threshold value SW1, SW2, SW3, . . . SWn. Furthermore, in a difference from the present exemplary embodiment in step S400, the parking maneuver data set PD can be provided if the quality value GW1, GW2, GW3, . . . GWn is less than the threshold value SW1, SW2, SW3, . . . SWn, and the steps S500 to S700 are executed if the quality value GW1, GW2, GW3, . . . GWn is greater than or equal to the threshold value SW1, SW2, SW3, . . . SWn.

As already explained, they are already assigned to the respective parking movements PZ1, PZ2, PZ3, . . . PZn and have at least partially different values.

Furthermore, the active parking assistant 4, in a difference from the present exemplary embodiment, may use threshold values SW1, SW2, SW3, . . . SWn, which at least become larger with an increasing number of parking movements PZ1, PZ2, PZ3, . . . PZn.

Furthermore, it may also be provided that the respective difference between two quality values GW1, GW2, . . . GWn, for example of GW1−GW2, GW2−GW3 and GW3−GW4, is formed and compared with a minimum value SW for a position improvement.

If the difference between two quality values is large or for example also equal to the threshold value SW, another parking movement PZ1, PZ2, . . . PZn will be added to the parking maneuver. If, on the other hand, the difference between two quality values is less than the minimum value SW, no further parking movement PZ1, PZ2, . . . PZn will be added to the parking maneuver, but the current parking maneuver data set PD will be provided.

Such a method may have the following steps:

In a first step S100, the active parking assistant 4 determines the parking maneuver data set PD with the first parking movement PZ1.

In a further step S200, the active parking assistant 4 determines the first quality value GW1.

In a further step S300, the active parking assistant 4 compares the first quality value GW1 with the first threshold value SW1.

In a further step S500, the active parking assistant 4 determines the further parking movement PZ2 and adds it to the parking maneuver data set PD.

In a further step S700, a change in the quality value GW1, GW2, GW3, . . . GWn is determined and the change in the quality value GW1, GW2, GW3, . . . GWn is compared with a minimum value and the parking maneuver is executed according to the current parking maneuver data set PD) if the change in the quality value GW1, GW2, GW3, . . . GWn is greater than the minimum value.

In a further step S800, the parking maneuver data set PD with the parking movements PZ1 to PZ4 is then provided for implementation in order to maneuver the motor vehicle 2 into the parking space 6.

The order of the steps may also be different from the present exemplary embodiment. Furthermore, multiple steps can be carried out at the same time or simultaneously. Furthermore, individual steps can also be omitted.

Thus, the parking maneuver can be kept short due to a minimized number of parking movements PZ1, PZ2, PZ3, . . . PZn.

The invention claimed is:

1. A method for operating a motor vehicle (2) with an active parking assistant (4), comprising:
   (S100) determining a parking maneuver data set (PD) with at least one parking movement (PZ1, PZ2, PZ3, . . . PZn) for a parking maneuver for parking in a parking space (6),
   (S200) determining a quality value (GW1, GW2, GW3, . . . GWn) representative of the parking situation of the motor vehicle (2) in the parking space (6) after the parking movement (PZ1, PZ2, PZ3, . . . PZn),
   (S300) comparing the quality value (GW1, GW2, GW3, . . . GWn) with a predetermined threshold (SW; SW1, SW2, SW3, . . . SWn),
   (S400) providing the parking maneuver data set (PD) if the quality value (GW1, GW2, GW3, . . . GWn) is less than the threshold value (SW1, SW2, SW3, . . . SWn),
   (S500) determining a further parking movement (PZ1, PZ2, PZ3, . . . PZn) of the parking maneuver data set (PD),
   (S600) determining a further quality value (GW1, GW2, GW3, . . . GWn) representative of the parking situation of the motor vehicle (2) in the parking space (6) after the further parking movement (PZ1, PZ2, PZ3, . . . PZn), and
   (S700) comparing the quality value (GW1, GW2, GW3, . . . GWn) with a predetermined threshold value (SW1, SW2, SW3, . . . SWn) if the quality value (GW1, GW2, GW3, . . . GWn) is greater than the threshold value (SW1, SW2, SW3, . . . SWn),
   wherein a threshold value (SW1, SW2, SW3, . . . SWn) assigned to each parking movement (PZ1, PZ2, PZ3, . . . PZn) is used, and wherein at least two threshold values (SW1, SW2, SW3, . . . SWn) are different.

2. The method according to claim 1, wherein with an increasing number of parking movements (PZ1, PZ2, PZ3, . . . PZn) the respective threshold values (SW; SW1, SW2, SW3, . . . SWn) are selected to be at least partially larger.

3. The method according to claim 1, wherein the quality value (GW1, GW2, GW3, . . . GWn) is indicative of a difference between a target parking position and an actual parking position of the motor vehicle (2) in the direction of travel.

4. The method according to claim 1, wherein the quality value (GW1, GW2, GW3, . . . GWn) is indicative of a difference between a target parking position and an actual parking position of the motor vehicle (2) in the direction of the vehicle width.

5. The method according to claim 1, wherein the quality value (GW1, GW2, GW3, . . . GWn) is indicative of a difference between a target parking position and an actual parking position of an orientation of the motor vehicle (2).

6. A vehicle comprises a processor configured to carry out the method according claim 1.

7. A method for operating a motor vehicle (2) with an active parking assistant (4), with the steps:
   (S100) determining a parking maneuver data set (PD) with at least one parking movement (PZ1, PZ2, PZ3, . . . PZn) for a parking maneuver for parking in a parking space (6),
   (S200) determining a quality value (GW1, GW2, GW3, . . . GWn) representative of the parking situation of the motor vehicle (2) in the parking space (6) after the parking movement (PZ1, PZ2, PZ3, . . . PZn),
   (S500) determining a further parking movement (PZ1, PZ2, PZ3, . . . PZn) of the parking maneuver data set (PD),
   (S600) determining a further quality value (GW1, GW2, GW3, . . . GWn) representative of the parking situation of the motor vehicle (2) in the parking space (6) after the further parking movement (PZ1, PZ2, PZ3, . . . PZn), and
   (S700) determining a change in the quality value (GW1, GW2, GW3, . . . GWn) and comparing the change in the quality value (GW1, GW2, GW3, . . . GWn) with a minimum value as well as execution of the parking maneuver according to the current parking maneuver data set (PD) if the change of the quality value (GW1, GW2, GW3, . . . GWn) is greater than the minimum value.

8. An active parking assistant (4) for the operation of a motor vehicle (2), comprising:
   a controller configured to:
      determine a parking maneuver data set (PD) with at least one parking movement (PZ1, PZ2, PZ3, . . . PZn) for a parking maneuver for parking in a parking space (6),
      determine a quality value (GW1, GW2, GW3, . . . GWn) representative of the parking situation of the motor vehicle (2) in the parking space (6) after the parking movement (PZ1, PZ2, PZ3, . . . PZn),
      compare the quality value (GW1, GW2, GW3, . . . GWn) with a predetermined threshold (SW; SW1, SW2, SW3, . . . SWn),
      provide the parking maneuver data set (PD) if the quality value (GW1, GW2, GW3, . . . GWn) is less than the threshold value (SW; SW1, SW2, SW3, . . . SWn),
      determine another parking movement (PZ1, PZ2, PZ3, . . . PZn) of the parking maneuver data set (PD),
      determine a further quality value (GW1, GW2, GW3, . . . GWn) representative of the parking situation of the motor vehicle (2) in the parking space (6) after the further parking movement (PZ1, PZ2, PZ3, . . . PZn),
      compare the quality value (GW1, GW2, GW3, . . . GWn) with a predetermined threshold (SW; SW1, SW2, SW3, . . . SWn) if the quality value (GW1, GW2, GW3, . . . GWn) is greater than the threshold value (SW; SW1, SW2, SW3, . . . SWn),
      wherein the active parking assistant (4) is designed to provide a threshold value (SW; SW1, SW2, SW3, . . . SWn) assigned to each parking movement (PZ1, PZ2, PZ3, . . . PZn), and wherein at least two thresholds (SW1, SW2, SW3, . . . SWn) are different.

9. The active parking assistant (4) according to claim 8, wherein with an increasing number of parking movements (PZ1, PZ2, PZ3, . . . PZn) the active parking assistant (4) is designed to select the respective threshold values (SW; SW1, SW2, SW3, . . . SWn) to be at least partially greater.

10. The active parking assistant (4) according to claim 8, wherein the quality value (GW1, GW2, GW3, . . . GWn) is indicative of a difference between a target parking position and an actual parking position of the motor vehicle (2) in the direction of travel.

11. The active parking assistant (4) according to claim 8, wherein the quality value (GW1, GW2, GW3, . . . GWn) is indicative of a difference between a target parking position and an actual parking position of the motor vehicle (2) in the direction of the vehicle width.

12. The active parking assistant (4) according to claim 8, wherein the quality value (GW1, GW2, GW3, . . . GWn) is indicative of a difference between a target parking position and an actual parking position of an orientation of the motor vehicle (2).

13. The active parking assistant (4) according to claim 8, wherein the active parking assistant (4) is designed to provide a parking maneuver data set (PD) with at least one parking movement (PZ1, PZ2, PZ3, . . . PZn) for a parking maneuver for parking in a parking space (6), to determine a quality value (GW1, GW2, GW3, . . . GWn) representative of the parking situation of the motor vehicle (2) in the parking space (6) after the parking movement (PZ1, PZ2, PZ3, . . . PZn), to determine another parking movement (PZ1, PZ2, PZ3, . . . PZn) of the parking maneuver data set (PD), to determine a further quality value (GW1, GW2, GW3, . . . GWn) representative of the parking situation of the motor vehicle (2) in the parking space (6) after the further parking movement (PZ1, PZ2, PZ3, . . . PZn), to determine a change in the quality value (GW1, GW2, GW3, . . . GWn), to compare the change in the quality value (GW1, GW2, GW3, . . . GWn) with a minimum value as well as to execute the parking maneuver according to the current parking maneuver data set (PD) if the change in the quality value (GW1, GW2, GW3, . . . GWn) is greater than the minimum value.

* * * * *